March 17, 1931. W. A. LOTH 1,796,295
DEVICE FOR DETERMINING THE DIRECTION OF FLOW OF A MAGNETIC FIELD
Filed March 23, 1923 2 Sheets-Sheet 1
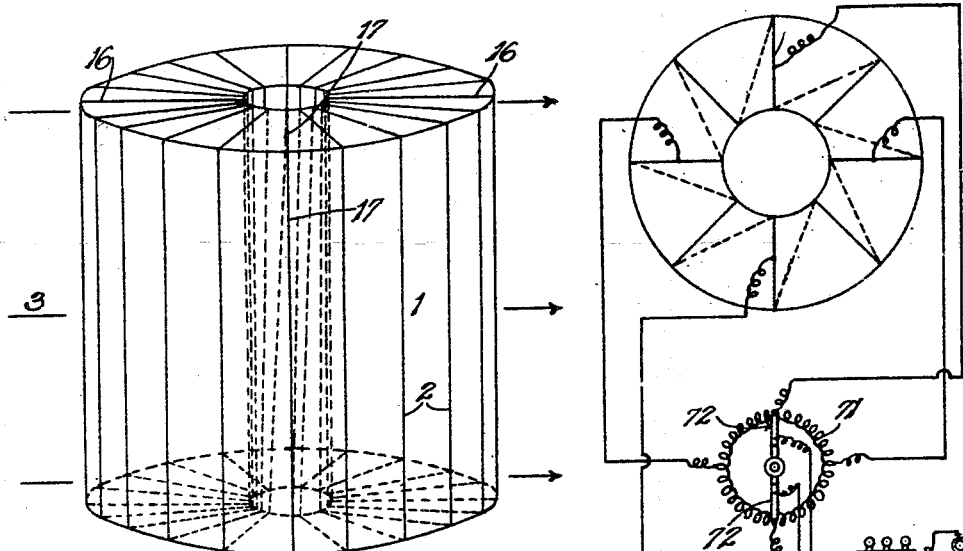
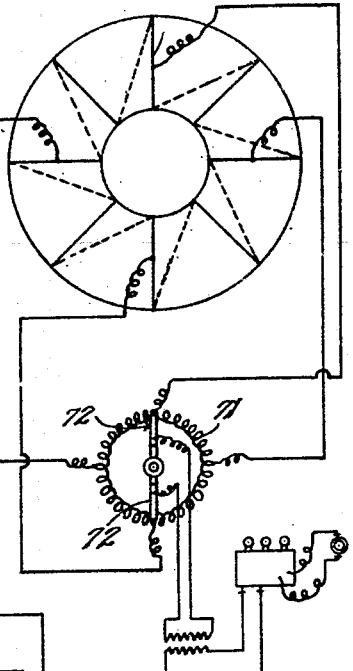
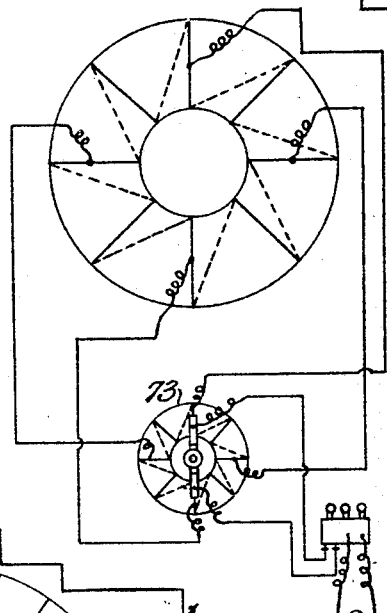
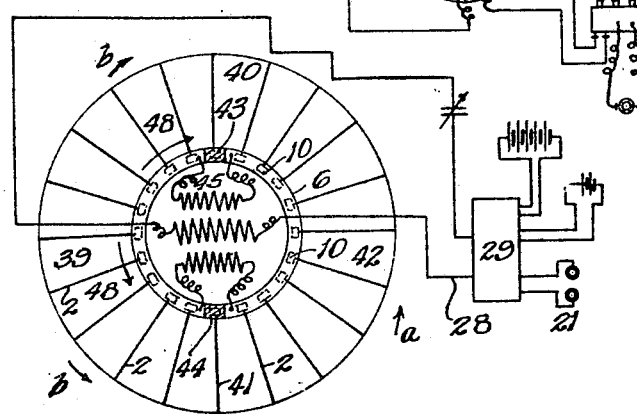
Inventor
W. A. Loth March 17, 1931. W. A. LOTH 1,796,295
DEVICE FOR DETERMINING THE DIRECTION OF FLOW OF A MAGNETIC FIELD
Filed March 23, 1923 2 Sheets-Sheet 2

Inventor
W. A. Loth
by Macker Clark
Attys.

Patented Mar. 17, 1931

1,796,295

UNITED STATES PATENT OFFICE

WILLIAM ARTHUR LOTH, OF PARIS, FRANCE, ASSIGNOR TO SOCIÉTÉ INDUSTRILLE DES PROCEDES W. A. LOTH, OF PARIS, FRANCE

DEVICE FOR DETERMINING THE DIRECTION OF FLOW OF A MAGNETIC FIELD

Application filed March 23, 1923, Serial No. 627,224, and in France March 18, 1922.

Application filed in France March 18, 1922, Patent No. 549,095.

The present invention has for its object a device for exactly determining the direction of the magnetic or electromagnetic fields of low, medium or high frequency. It comprises windings preferably radially arranged about a common axis and connected in series; the currents induced in these windings by an external magnetic or electromagnetic field being collected by means of a commutator, which is provided with two rotating brushes diametrically arranged opposite each other and electrically connected together by means of a receiving apparatus, such as an amplifier and telephone.

In the accompanying drawings and by way of example:

Fig. 1 is a diagram showing the radially arranged windings.

Figs. 2 and 3 illustrate two forms of construction of the device in accordance with the invention.

Figs. 5 and 6 are end views of two constructional modifications of the commutators combining with the windings of the armatures.

Figure 4:
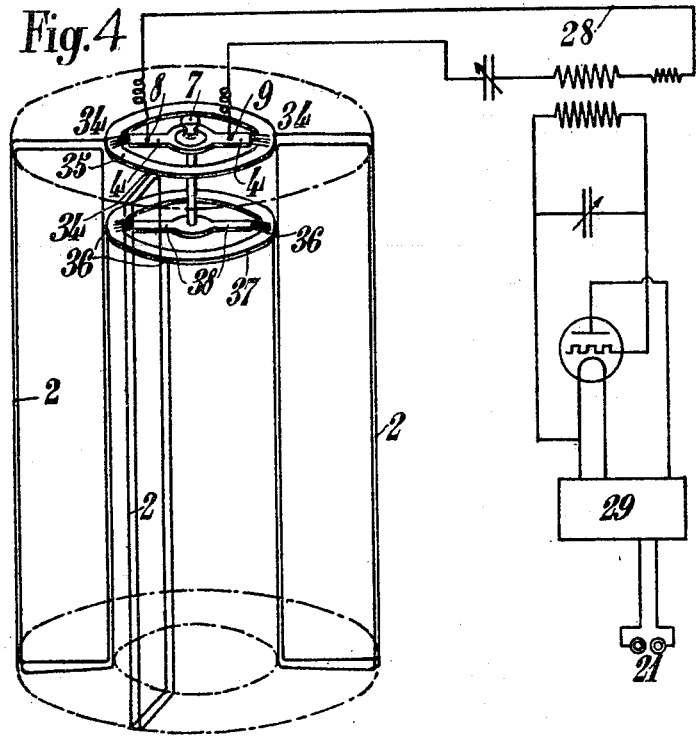
Fig. 4 shows a form of construction of the armature.

The drawing shows the use of a winding in the shape of a ring, on a vertical cylinder 1 (nonmagnetic for instance), having a permeability equal to that of the air. The winding is constituted by an insulated conductor 2 wound according to the radii of the base circles and the generatrices of the hollow or solid cylinder 1, made of wood for instance. These turns form a circuit completely closed on itself, either directly or through the medium of a device for putting it in resonance. For collecting the induced current generated in this winding 2 by the variations of the magnetic flux 3 passing through these turns, use is made (Fig. 2) of a switch rotating about an axis 7 and carrying at the end of its arms brushes 72 electrically insulated relatively to each other. These brushes 72 rub on a resistance, which is either a purely ohmic resistance 71 as shown in Fig. 2, or an inductive resistance 73 as shown in Fig. 3. Wires connect equidistant points of the resistance 71 or 73 to equidistant points of the winding 2.

To the two brushes 72 can be connected telephones or any current detectors, either directly or through the medium of amplifiers tuned or not. The apparatuses may also, instead of being directly connected to the brushes 72, be connected thereto through the medium of one or more transformers, this allowing to put again the secondary circuit or circuits in resonance on a chosen frequency.

Operation: Assuming that the magnetic field explored is of low frequency (600 periods), it is easily seen that the magnetic variable field 3 induces an electric current in the turns wound on the drum 1 and closed on themselves.

The intensity of this current is a function of the variation of the flux which has a determined value and a known frequency, but it will be seen that the elementary currents induced in each turn or each group of turns of the winding vary from one to the other and are then a function of the inclination of these turns on the direction of the flux. Thus the current induced in the turns the planes of which are parallel to the direction of the magnetic flux, low frequency (turns 16) is null since no line of force of the field 3 passes through their surface. Conversely, the maximum currents are induced in the coils 17, the planes of which are at right angle to the lines of force of the magnetic field 3. Therefore, the elementary currents induced in each turn depend on the location of this turn relatively to the flux and vary from one to the other, but the total current collected by the brushes, current which impresses the receiving apparatus is, for a position of the brushes relatively to a flux, the sum of these elementary induced currents which are unequal, and, for all the other positions of the brushes relatively to the flux, is the result, characteristic for each position, of a differential reception of the two halves of the winding. It will be noted that in the particular case of the winding passing again through the center, there are two turns or two coils, symmetrical relatively to the center, which occupy positions equal in inclination and approximately equivalent in distance, relatively to the flux. The currents induced in these turns or coils are therefore very approximately equal. In the case of the winding passing around the drum 1 according to the successive diameters, by turning about the center, each turn or each coil occupies, on the contrary, a different position characteristic, relatively to the flux and each elementary induced current has a characteristic value different of that of the current induced in the other turn or coil nearest to the right or to the left.

It will be noted that these elementary induced unequal currents from a turn (or coil) to the following one, are added to each other for each half of the winding taken on one side of the magnetic flux (Fig. 1) and that their sum is opposed to the equal sum of the elementary induced currents, unequal to each other, of the other half of the winding, symmetrical to the first half relatively to the direction of the flux. The resulting induced current is therefore, as above stated, null in the induced winding closed on itself.

If by means of a conductor external to the winding, the connection is effected of points (two for instance) of this latter (and, for example, two diametrically opposed points), the current circulating in this conductor, on which can be directly or indirectly branched current detectors, will therefore be function of the position of the brushes relatively to the direction of the flux generated by the external field and, as stated, characteristic of this position.

It is possible to use two points of contact for instance. If these two points of contact are placed according to the direction of the magnetic flux 3 of a frequency of 600 periods per second, it will be seen that the resulting current will be maximum.

On the contrary, it will be seen that if one connects by means of an external circuit, diametrically opposed points which are placed at right angles to the direction of the magnetic flux, no current will pass through the receiving apparatus, each quarter of the winding being compensated by the quarter, equivalent in position relatively to the magnetic flux 3 and belonging to the other half of the armature.

The turns, frames or elementary windings 2 constituting the armature can also be connected either in parallel, or by series-groups connected in parallel. These turns, frames or windings can also constitute independent windings the connection of which about a common directing axis fictiously represents the former-solid of the said windings. The connections between these windings are then so devised that the latter are connected in parallel.

The current produced in the windings 2 of the armature can be collected in various manners. By way of example there will be described hereafter two particular means applying one to the case in which the receiver is itself in parallel with the windings 2 of the armature (the commutator being very or not very resisting according to the nature of the receiver) the other, in case the receiver is connected in series with the circuit of the windings 2 of the armature.

Fig. 4 relates to the first of these means; only three groups of two turns have been shown for each elementary armature winding instead of $n$ ($n$ can, for instance, be equal to 360, 180 or 90).

The ends 34 of the conducting turns 2 are connected to a collecting ring 35, of known resistance. The opposite ends 36 of these turns 2 are connected to a second conducting ring 37. The brushes 4, insulated from each other, allow of collecting the current produced in these turns 2 by a variable magnetic or electromagnetic field, of any frequency. Between the brushes 4 is branched the receiver 21 of electric current, either directly in a circuit tuned or not or indirectly, with circuit tuned or not, through the medium of an amplifier 29.

These arrangements allow of receiving by any of the methods used in high or low frequency, either for telegraphic or telephonic applications, or for all the other applications, such as the guiding of ships and airplanes.

A conducting bar 38 can be added to the said arrangements; this bar moving on the commutator 37 together with the brushes 3; the said bar is made in one piece or in this bar is inserted a second receiver acting either in combination with that numbered 21 which is inserted between the brushes 4, or independently of the receiver 21. The brushes 4 rubbing on the conducting ring of the commutator can be arranged in alignment with each other or they can form an angle of 90° if two receivers are used as previously indicated. In the latter case, instead of receiving in the same manner, one of the receivers receive at the maximum, whilst that combined with this receeiver receives at the minimum; both receive in an equal manner when they are placed at 45° relatively to the direction of the maximum of reception. All the desirable combinations can then be effected between these two induced received currents, either by adding them or by opposing them. It is also possible to effect the same combination of brushes 4 and 38 angularly arranged on the rings 35 and on the rings 37.

Figure 5:
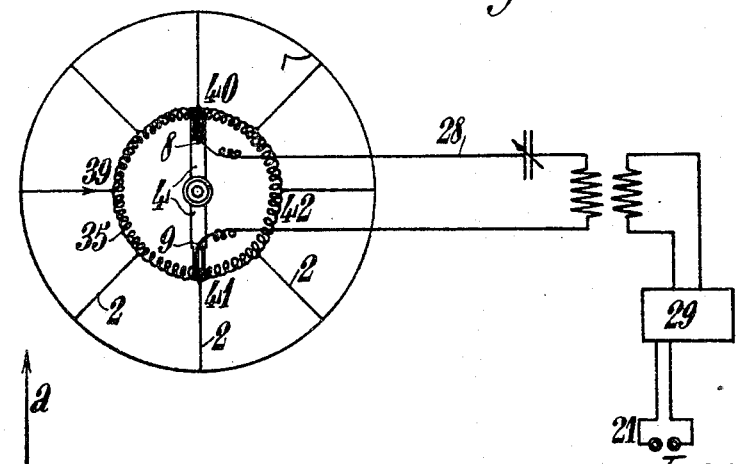

Fig. 5 illustrates, in plan view, the armature and shows more particularly the commutator 35 constituted by turns of bare resisting wire, corresponding to the resisting ring 35 (Fig. 15). If it is admitted that the flux follows the direction of the arrow $a$, it will be seen that the induced currents will follow the directions 39 towards 40 and 39 towards 41 in the commutator. If the brushes are placed as shown in the line 40—41, they will receive at the maximum. A kind of Wheatstone bridge is thus obtained the effect of which will be increased owing to the arrangements of a second pair of brushes 38 moving on the second collecting ring 37; these brushes are either directly and metallically connected, or are connected to each other at the terminals of a receiver.

It is obvious that in the case of turns in parallel as well as in the case of turns in series, the direction of the flux could also be obtained by causing the whole of the induced receiver to rotate about its axis; but it is preferable to keep this fixed armature and to operate as described.

In the form of construction shown in Fig. 6, the ends of the conducting turns 2 are connected to contact-pieces 10 insulated from each other. In the figure, for the clearness of the drawing, 20 turns only have been shown. The opposite ends of these turns are connected together by a conducting ring similar to the ring 37 and forming a commutator, or are also connected to contact-pieces insulated from each other on which can bear and rotate a metallic ring cut at two points and in which are arranged two transformers or less. In the latter case, the operation of the commutator connected in parallel to the ends of the turns 2 is similar to that of the commutator connecting their other ends.

On the contact pieces of one or the other commutator rests a collecting ring 5—6 which can slide on the same by rotating about an axis passing through the center of the system. This ring 5—6 is cut at two points 43—44 as shown for instance in Fig. 17. These gaps are constituted by insulating surfaces. The terminals of the primary 45 of the transformer or those of a receiver are connected either directly or indirectly to the ends of the first break or gap 43, the ends of another primary 46 or of another receiver are connected to the ends of the second break or gap. In the diagram of installation shown in Fig. 17, the ends of the break or gap 43 on the one hand and the ends of the break or gap 44 on the other hand, are connected to the terminals of the two primary windings 45—46 of one and the same (or of two) transformer, the common secondary 47 of which (or the separated secondaries) are in tuned circuit, either directly or through the medium of an amplifier 29, with the receivers 21 or current detectors.

If it is admitted that the direction of the flux is that indicated by the arrow $a$, it will be seen that if the movable commutator 5—6 with double break 43—44 (which can slide on the contact pieces 6 in the directions indicated by the arrows $b$) occupy such a position that these breaks 43—44 are arranged on the straight line 40—41, the currents induced in the turns by the flux then circulate in the direction of the arrows 48, and the windings of the transformers will be traversed by maximum and equal induced currents. On the contrary, if the position of the collecting ring 5—6 on the contact pieces 10 is such that the breaks 43 and 44 are arranged on the line 39—42, the transformers will be traversed by a minimum current which can even become null. From the position of the brakes 43—44 on the graduated circle (in degrees for instance) at the time of the maximum or minimum reception, it is possible to determine the direction of the field. The direction of the flux can obviously be determined by a compared reception of the two primaries of the transformer placed at the breaks 43—44.

It is obvious that instead of two breaks as shown, it is possible to use a conducting ring presenting a greater number of breaks and such for instance as four breaks arranged at 90° from each other.

As shown in Fig. 2, the resistance 71 is set in position relatively to the winding 2 so that the tappings on the two apparatuses occupy identical respective positions. If this condition is not carried out, it will be convenient to angularly move the resistance 71 so as to cause the minimum observed by it to coincide with the parallel or perpendicular to the direction of the magnetic or electromagnetic inducing field.

On the resistance rub two conducting brushes 72 insulated from each other and arranged diametrically opposite to each other. Each of them is in relation with a terminal of the receiving circuit. These brushes can thus respectively rub on fixed metallic crowns in relation with the receiving circuit. It is seen that the distribution of the induced currents in the turns of the winding 2 are reproduced at a distance in the turns of the rheostat 71.

Two characteristic positions are thus obtained, one of which gives a maximum, the other a minimum current in the receivers and this in a very precise manner. For intermediate positions one has currents of corresponding values intermediate between the maximum and the minimum. Instead of two brushes, a greater number of brushes symmetrically arranged can be used.

This resistance can obviously have any winding, inductive or not and if it is wound on a core, this core may be metallic or not, laminated or not, etc. It is obvious that the various commutators described can be combined together, on the armature or at a distance.

It is obvious that, instead of the resistance, a small inductive winding might be used, constructed for instance as previously described for the winding 2. In this case, the conductors starting from the tappings on the turns of the receiving winding 2 similarly leading to the corresponding turns of the inductive winding 73 on which the current is taken directly or indirectly by means of a contact brush, for instance.

If the applications of the invention are now considered, the following remarks may be made:

In case of electromagnetic guiding for instance, or in case of wireless telegraphy, it is known that on board certain movable objects (airplanes or ships), the reception can be hindered by local parasites arising from electric apparatuses (magnetos, dynamos, etc.). It is known that these effects can be compensated by means of a small frame placed near the producers of parasites. It is obvious that, in this case, the small frames can be replaced by small windings according to the invention, provided with a commutator and placed above or at a distance. These small compensating windings are then directly or indirectly connected to the large frames or to the large receiving windings.

Moreover, it is to be noted that, when the guiding of ships is effected, use is made, in combination with vertical frames, of two horizontal frames laterally arranged on either side of the axis of longitudinal symmetry of the movable object. The side frames may also be replaced by windings similarly arranged. The commutators can also be placed relatively to each of the windings in the position most favourable for the comparison of the intensities. These arrangements permit, at every moment, to determine the inclination of the lines of force of the magnetic field passing through each winding. As on the other hand, the shape of the field is known, it is therefore possible, for one and the same known height of the bottom, to determine the distance from the movable object to the emitting cable-function of the inclination of the lines of force. This method is safer and more sensitive than that permitting to determine the distance by evaluation of the variation of the inensity of reception.

What I claim as my invention and desire to secure by Letters Patent is:

1. In an apparatus for exactly determining the direction of electromagnetic fields, a closed winding formed by a plurality of turns of conductors arranged angularly relatively to each other and connected in series, a resistance arranged circularly, conductors connecting points of said circular resistance to corresponding points of the closed winding, and brushes provided for effecting a contact with said resistance and arranged in a receiver circuit.

2. In an apparatus for exactly determining the direction of electromagnetic fields, a closed winding determining a body of revolution formed by a plurality of turns or conductors arranged angularly relatively to each other and connected in series, a resistance arranged circularly, conductors connecting points of said resistance to corresponding points of the closed winding, and two diametrically opposite brushes provided to effect a contact with said circular resistance.

3. In a radio apparatus comprising a closed winding, breaks in the continuity between the ends of each successive turn of said winding, a circular inductive resistance, and conductors connecting equidistant points of said resistance to corresponding points of the closed winding, a receiver circuit, and means for connecting the diametrically opposite turns of said winding in parallel with the receiver circuit.

In testimony whereof I have signed my name to this specification.

WILLIAM ARTHUR LOTH.